United States Patent Office 3,237,453
Patented Mar. 1, 1966

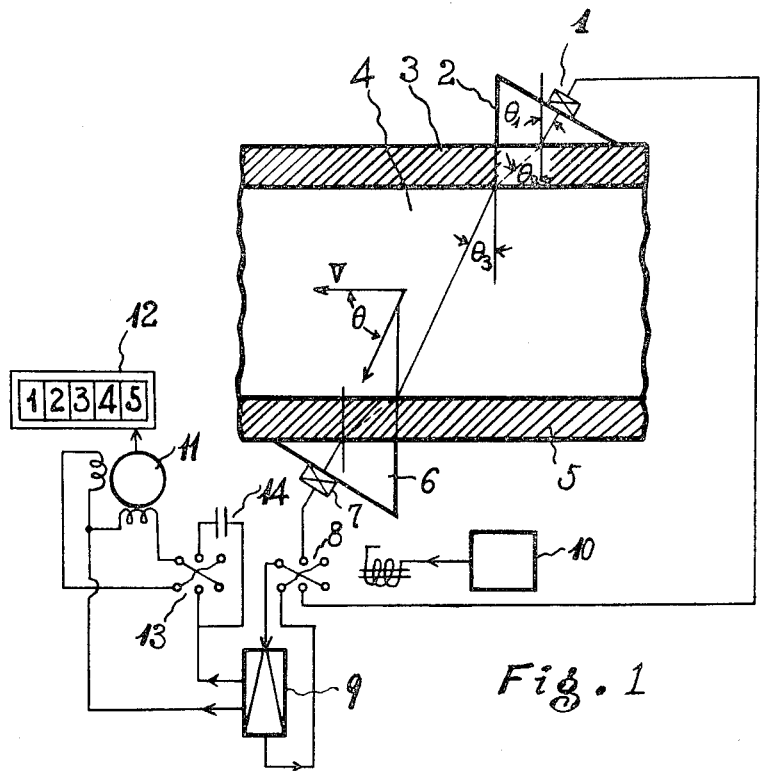
(A)
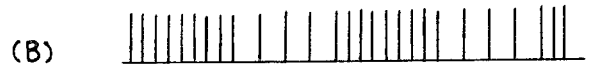
(B)
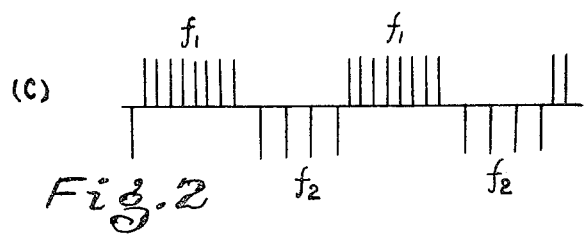
(C)
Fig. 2

3,237,453
ULTRASONIC FLOWMETER SYSTEM
Miaki Yamamoto, Tokyo, and Kazuyuki Ito, Yokohama, Japan, assignors to Tokyo Keiki Seizosho Company, Limited, Tokyo, Japan, a company of Japan
Filed Aug. 1, 1963, Ser. No. 299,278
Claims priority, application Japan, Aug. 24, 1962, 37/35,057
2 Claims. (Cl. 73—194)

This invention relates to the art of measuring the rate of flow of a fluid through a vessel, and is concerned with the provision of a new and improved ultrasonic flowmeter system.

Though various types of flowmeter systems utilizing ultrasonic waves have been devised, no such system has yet been realized in which the velocity of a liquid or the rate of flow of gas flowing in a pipe can be measured from outside of the pipe. The main reason has been that in all cases ultrasonic transmission loss is very large; also there are many accompanying technical difficulties.

In order to overcome those difficulties, the present invention relates to a system which employs only a pair of transducers and causes them to be switched periodically and to effect a "sing around" function. That is to say, because of only a pair of sing-around elements used, the transmission power can be taken very large, and since only a pair of acoustic transducers and only one electric transceiver are employed, the measurement error can be minimized. Therefore, according to the present invention, not only can the flow velocity of the interior liquid be measured from outside of the pipe, but very high accuracy of measurement can be obtained. Further, one advantage of the present system is that the integrated quantity of flow can be easily indicated.

The invention will now be described in greater particularity in the following, taken with the graphic exposition provided in the accompanying drawing, in which FIG. 1 is a block diagram illustrating one embodiment of the present invention; and FIG. 2 diagrammatically shows electrical waves appearing in the electrical circuit of FIG. 1.

Referring now to FIG. 1, numeral 1 designates a transducer which converts an electrical pulse to an ultrasonic pulse. As such transducer there may be utilized one of quartz or barium titanate ceramic or magnetostrictive vibrator or the like. The ultrasonic pulse transmitted from transducer 1 advances straight through a shoe 2 and impinges on the pipe surface at an incident angle $\theta_1$. As a material of the shoe, plastic is, in many cases, most suitable, through which substance the acoustic velocity is assumed to be $C_p$. The ultrasonic wave or beam which has impinged on the pipe wall 3, assuming that the acoustic velocity through which is $C_w$, is refracted at a refracting angle $\theta_2$. Then, the ultrasonic beam, assuming the acoustic velocity through the liquid to be C, enters into the liquid at a refraction angle $\theta_3$. In those cases, the following Snell's law applies:

$$\frac{C_p}{\sin \theta_1} = \frac{C_w}{\sin \theta_2} = \frac{C}{\sin \theta_3} \quad (1)$$

It is noted that the above relation holds good whether the type of wave in the pipe wall is longitudinal or shear wave. The ultrasonic beam which has advanced straight through liquid 4 enters into pipe wall 5, and then through shoe 6, and is received in transducer 7. In these cases, the relation of refraction angles, if respective materials are similar as above mentioned, can be represented by Formula 1.

An electrical pulse is generated by the ultrasonic pulse received in transducer 7, which electrical pulse or input signal enters through a change-over switch 8 into an electrical transceiver 9. In the latter, the input signal is amplified and the output signal is applied through switch 8 to transducer 1. The transducer 1 converts an electrical pulse into an ultrasonic pulse, which is transmitted into shoe 2.

Such a system as above described is termed a "sing around system" in which electrical pulses and ultrasonic pulses are converted alternately to each other to circulate round and round, wherein one period of cycle is called a "sing around period" and its reciprocal is called a "sing around frequency."

Now, assume that the velocity of liquid flow is V and that the angle of the advance direction of ultrasonic beam from the direction of liquid flow is $\theta$, where $\theta=90°-\theta_3$. Then, the time required for the ultrasonic pulse to propagate through the liquid, in case the propagation direction is along the flow, is $$(D/\sin \theta)/(C+V \cos \theta)$$

where D is diameter of the pipe. In case the propagation direction is opposite to the flow, the required time is $$(D/\sin \theta)/(C-V \cos \theta)$$

Therefore, assuming that the sum of time required for the ultrasonic wave to propagate through the shoes and the walls and time of electrical circuit delay in the electrical transceiver is T, the sing around period is, in each case the ultrasonic beam is along, or opposite to, the flow is respectively $$t_1 = \frac{D/\sin \theta}{C+V \cos \theta} + T \quad (2)$$

$$t_1 = \frac{D/\sin \theta}{C-V \cos \theta} + T \quad (3)$$

Since, in ordinary cases, the acoustic velocity in liquid C is very large as compared with flow velocity V, and since for large diameter pipe the propagation time is larger than other delay times T, the sing around frequency is, corresponding to Formulae 2 and 3, respectively:

$$f_1 = \frac{1}{t_1} = \frac{C+V \cos \theta}{l}\left(1-\frac{T}{l/C}\right) \quad (4)$$

$$f_2 = \frac{1}{t_2} = \frac{C-V \cos \theta}{l}\left(1-\frac{T}{l/C}\right) \quad (5)$$

where it is assumed $$l \frac{D}{\sin \theta}$$

Therefore, taking the difference between them, $$\Delta f = f_1 - f_2 = \frac{2 \cos \theta}{l}\left(1-\frac{T}{l/C}\right)V \quad (6)$$

From it one finds that by obtaining the sing around frequencies in both directions where the ultrasonic beam is along the flow ("co-current") and opposite to the flow ("counter-current") and taking their difference, the flow velocity can be measured.

To this end the transducers 1 and 2 are switched alternately to transmission and reception at equal time intervals. More specifically, in a periodical signal generator circuit 10 there is generated a synchronous signal at equal time intervals as shown in FIG. 2 by (A). By this signal, switch 8 is changed over and effects switching of the above mentioned transducers. Then, the output signal of transceiver 9 is switched sequentially in such a way that the direction of ultrasonic beam is downstream, upstream, downstream, and so on at equal time intervals, thus resulting in as shown in FIG. 2(B).

Next, a method by which $\Delta f = f_1 - f_2$ as shown in FIG. 2(C) is obtained from the above mentioned signal will be described referring to FIG. 1. This example is in case of integral indication, but for the purpose of obtaining an instantaneous value of flow, a reversible counter may be utilized.

A pulse motor 11 is employed the output of which motor operates a counter 12, and the rotation of pulse motor 11 is reversed in response to the synchronous signal. Namely, by the output of synchronous signal generator 10 is changed-over the switch 8 as well as the switch 13. Then, by the switching of phase shift condenser 14, the rotation of the pulse motor is reversed sequentially synchronous with the switching of the transducers, thereby obtaining the above mentioned relationship $\Delta f = f_1 - f_2$.

In the practical case, the transducer and the shoe are mutually fixed, constituting a probe. An ultrasonic flaw detector may be utilized by which the probes are mounted at such relative positions that a most powerful wave through the liquid can be received. Then the Relation 1 holds good.

Next, by an electronic counter, the value "$(f_1+f_2)$" is obtained. Then, since $$f_s = f_1 + f_2 = \left(1 - \frac{T}{l/C}\right)\frac{2C}{l} \tag{7}$$

the Formula 6 becomes:

$$\Delta f = f_s \frac{\sin \theta_1}{C_p} \cdot V \tag{8}$$

Since $\theta_1$ is known and $C_p$ can be obtained previously by experiment, the flow velocity can be obtained without knowing anything about the material, or the wall thickness and diameter of the pipe or the kind, temperature and pressure, etc., of the liquid.

Though the above description relates to flow measurement of liquid flowing in a pipe, the latter may be changed to an open channel. Furthermore, in case the measurement from outside of a pipe is difficult, such as in case of gas and the like, the front surface of the probes may be in contact with the fluid to be measured.

We claim:
1. An ultrasonic flowmeter system, characterized in comprising a first probe means, attached to a vessel through which a fluid to be measured is flowing, for obliquely transmitting a train of ultrasonic pulses; a second probe means having substantially the same characteristics as the first probe means for receiving the transmitted ultrasonic pulses, said second probe means being attached to the vessel at a position on the side opposite said first probe means which permits most efficient reception of the transmitted ultrasonic pulses; electrical circuit means in response to the reception of pulses in the second probe means for causing the first probe means to transmit a next ultrasonic pulse; switching means for reversing the transmission and reception of ultrasonic pulses of the two probes at predetermined time intervals, and means for counting the difference between the frequencies of pulse repetition in the electrical circuit means in the co-current and counter-current cases, thereby to measure the flow velocity of the fluid flowing in the vessel.

2. The flowmeter system defined in claim 1, wherein said difference-counting means comprises a reversely rotatable pulse motor and a counter device actuatable by said pulse motor, said pulse motor being operatively associated with said switching means.

References Cited by the Examiner
UNITED STATES PATENTS
2,949,772   8/1960   Kritz _____ 73—194
3,007,637   11/1961  Meirowitz _____ 235—103

OTHER REFERENCES
Franklin et al.: IRE Transaction on Medical Electronics., pp. 204–206, December 1959.
Greenspan et al.: The Review of Scientific Instruments, vol. 28, No. 11, pp. 897–901, November 1957.

RICHARD C. QUEISSER, *Primary Examiner.*